United States Patent Office 3,290,155
Patented Dec. 6, 1966

3,290,155
PROCESS FOR PREPARING DEBITTERED FULL-FAT SOYBEAN MATERIALS
Gus C. Mustakas and Edward L. Griffin, Jr., Peoria, Ill., assignors to the United States of America as represented by the Secretary of Agriculture
No Drawing. Filed Aug. 19, 1963, Ser. No. 303,186
1 Claim. (Cl. 99—98)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel and greatly shortened process of treating full-fat soybean flakes or grits to obtain completely, debittered, food grade, full-fat soybean flakes, or flour milled therefrom, which products have superior nutritional and physical characteristics.

More particularly this invention relates to a remarkably rapid and, therefore, commercially attractive process for treating full-fat soybean flakes or grits, which process comprises imposing on critically moisturized and preheated soybean flakes or grits a critical dynamic or kinetic pressure during a very brief high temperature heating or cooking period to provide full-fat soybean material that is bland and debittered, is free of nutrition-depressing factors, particularly trypsin inhibitor and stability-affecting enzymes including urease, protease, lipase, and amylase.

Furthermore, the full-fat soybean flours obtained by milling the flakes or grits that have been treated in accordance with our invention are very dispersible in aqueous media and thus can be made into a milk substitute and can be readily and uniformly blended into other foods requiring fortification.

It is known that the proteins of raw soybeans are unpalatably bitter and have a low nutritive efficiency (biological value), the latter apparently because of the presence of trypsin inhibitor. It is also known that the bitter or beany flavor can be destroyed and the biological efficiency of the protein improved by about 20 to 45 minutes of mild cooking or toasting of either the defatted or the full-fat soybean material.

Full-fat soybean flour is an article of commerce for which standards have been published by the Soybean Council of America under the title, "Tentative Quality and Processing Guide, Edible Soy Flour or Grits" (July 1961). Bland, full-fat soybean flours from flakes or grits that have been subjected to relatively mild temperatures with or without steam pressures of up to about 15 p.s.i.g. for on the order of about 20–45 minutes in steam-jacketed conveyors, horizontal cylinders, or in compartment trays are used in the baking industry as additives in bread, rolls, doughnuts, muffins, etc. for their shortening effect. Because of their low starch content, full-fat soybean flours are employed by diabetics and are also used in other special diets including those of infants who are allergic to cows' milk. Full-fat soy flour is also sent to underprivileged countries where it is dispersed in water to form an inexpensive milk substitute.

The principal object of our invention is a novel and greatly shortened process for providing full-fat soybean flakes, grits, and flours therefrom that are free of bitterness, have greatly improved biological efficiencies because of the complete inactivation of the nutrition-suppressing trypsin inhibitor coupled with the avoidance of significant denaturation and destruction of essential amino acids, e.g., lysine, while preserving the other desirable constituents of the original soybean, i.e., vitamins, unsaturated fatty acids, phosphatides, proteins, sterols, etc.

A more specific object is the preparation of full-fat soybean materials having the above described characteristics by subjecting critically pre-conditioned full-fat soybean flakes very briefly to moist heat in the presence of a concurrently imposed highly critical dynamic or kinetic pressure having a value of 375–400 p.s.i., which pressure apparently is just sufficient to expel to the surface only the amount of visible free soybean oil that is then at once completely resorbed by the hot, partially exploded soybean material formed by the abrupt cessation of the dynamic pressure accompanying ejection of the pressurized soybean material into the atmosphere through the extrusion die of a steam-equipped screw-press.

Still another object of our invention is an advantageously shortened process for producing food-grade full-fat soybean flakes or grits and flours.

The above and other objects of our invention will be more readily understood in the course of the following disclosure.

In accordance with the objects of our invention we have now discovered that superior food grade full-fat soybean material is obtained when dehulled full-fat soybean flakes or grits having a normal or tempered moisture content of between about 9 percent to about 12 percent are subjected batchwise or preferably continuously in a jacketed container to condensed steam for from 2½ minutes to 3 minutes so as to bring the flakes or grits up to a temperature of about 95° C., then immediately subjecting the thusly heated flakes or grits to 5–10 seconds of residence in a high speed mixing apparatus having steam admission means in order to raise their temperature to 99°–102° C. and their moisture content to a level of from 16 percent to 21 percent, then directly passing the hot, moist flakes or grits into a conventional steam-jacketed screw-type extruder having at least two chamber sections separated by an air lock die and terminated by a highly perforated extruder die, wherein the temperature of the soybean material present is increased to a level of 115° to 145° C. during a residence time of only 60–90 seconds while imposing a dynamic pressure of 375–400 p.s.i. by means of the extruder screw, the said pressure being just sufficient to expel from the partially cooked soybean material and onto the surface thereof only the amount of oil that can be immediately resorbed by the hot material when it is abruptly relieved of pressure by passage through the extruder die (evidenced by the absence of a stream of unresorbed oil), cooling the extruded pellet-like agglomerates with air, vacuum drying to a moisture content of 3 to 4 percent, and milling the substantially dry agglomerates through smooth rolls to a 100 mesh flour.

Our process is operative even with screw-type extruders not equipped with internally placed pressure indicating means inasmuch as the required critical pressure can be obtained by visual inspection of the material issuing from the perforated extruder head, an only momentary presence of surface oil being easily noted. Furthermore, any substantial and totally inoperative excess of pressure exerted on the substrate by the screw expels an amount of oil that forms discrete and readily observable streams issuing from the die.

Although one might expect kinetic or dynamic pressure to be converted to a roughly equivalent amount of heat energy, the mechanism for our unexpected results is not that simple since the mere application of high heats even for very brief periods greatly denatures the protein yet fails to make the product bland and palatable. Without wishing to be held responsible for the precise mechanism whereby our process is operative, we believe that the dynamic pressure supplements and facilitates an even, extremely rapid and otherwise unobtainable transfer of indirect heat from the heated inner surface of the screw-type extruder.

The following specific examples and the data of Table I will more clearly illustrate our invention.

Example 1

Dehulled full-fat soybean flakes having an average thickness of 0.01 inch and a moisture content of 10.6 percent were introduced at the rate of 71 lb./hr. into a small commercial-type steam-jacketed horizontal mixer (pre-conditioner) having steam admission and temperature indicating means. During a residence time of about 2.75 minutes (165±15 seconds) sparge steam equivalent to 2 pounds of condensate per hour was admitted, giving the flakes a final temperature of 93° C. and a moisture content of 13.1 percent. The hot flakes were then subjected to about 10 seconds of mixing in a steam-equipped high speed mixer which raised the temperature of the flakes to 99° C. and the moisture content to 15.6 percent. The flakes were then directly transferred to a commercial steam-jacketed externally driven screw-extruder comprising an initial feeder section, a steam-lock die, two center air-lock sections each having a steam-lock die, and a terminal cone extruder section terminating in a highly perforated extruder die. The terminal pressure in the extruder was adjusted to a level that just avoided the presence of unresorbed oil at the extruder die. During a residence time of 1½ minutes the flake temperature was increased to a final temperature of 117° C., the apparent moisture content of the extrusion-exploded agglomerates being 14.8 percent. After both forced air and vacuum drying the agglomerates having a moisture content of 3.1 percent were passed through smooth rolls to provide a 100 mesh flour having the characteristics set forth in Table I.

Example 2

Dehulled full-fat soybean flakes 0.01 inch thick and having a moisture content of 12.0 percent were treated in the same manner as the flakes of Example 1 with the exceptions that they were introduced into the horizontal mixer (pre-conditioner) at the rate of 66 lb./hr., steam being admitted thereto at a rate equivalent to 3.5 pounds of condensate per hour, thus raising the temperature of the flakes to 96° C. at the end of the 2¾ minutes' residence. In the high speed mixer steam was added at a rate equivalent to 3.0 of condensate per hour to provide a flake temperature of 102° C. and moisture content of 21.5 percent. In the extruder (residence time 1 minute) the flake temperature rose to 137° C. and the final apparent moisture content was 18.2 percent. After drying and rolling as in Example 1 the flour had the characteristics set forth in Table I.

TABLE I.—COMPARISON OF EXTENDED FULL-FAT SOY FLOUR WITH SPECIFICATIONS FOR COMMERCIAL FULL-FAT SOY FLOURS

|  | Extruded Flour Products | | Specifications for General Purpose-Full-Fat Soy Flour [1] |
|---|---|---|---|
|  | Example | | |
|  | 1 | 2 | |
| Chemical: | | | |
| Moisture, percent | 3.1 | 3.7 | [2] 8 |
| Protein | 44.44 | 44.78 | [3] 40 |
| Crude fat | 20.17 | 20.10 | [3] 20 |
| Ash | 5.00 | 4.85 | [2] 6 |
| Crude fiber | 3.0 | 2.9 | [2] 3 |
| Degree of Toasting: | | | |
| NSI | 15.7 | 15.0 | |
| Trypsin inhibitor assay percent inhibition | 95.5 | 95.5 | |
| Urease activity pH increase (Caskey-Knapp) | 0 | 0 | 0-0.3 |
| Physical, Screen, percent through 100 mesh screen minimum | 95.7 | 94.1 | 95 |
| Flavor and Stability Factors: | | | |
| Peroxide value m.e.g./1,000 g. extracted oil | 0.76 | 0.12 | |
| Free fatty acid, percent in extracted oil | 0.52 | 0.55 | |
| Organoleptic | (4) | (4) | |
| Biological Values: | | | |
| Available lysine percent of protein | 5.15 | 4.95 | |
| Protein efficiency ratio Rat bioassay G. gain/g. protein fed | 2.53 | 2.44 | |

[1] Soybean Council of America, "Tentative Quality and Processing Guide, Edible Soy Flour or Grits," July 1961.
[2] Maximum.
[3] Minimum.
[4] Debittered, bland.

Having disclosed our invention, we claim:

A process for preparing debittered, food-grade, essentially undenatured, trypsin inhibitor-free, full-fat soybean material that can be milled to a water-dispersible 100 mesh flour suitable for the preparation of soy milk, comprising heating dehulled full-fat soybean flakes having an initial moisture content of 9 percent to 12 percent in a closed container with sparge steam for 2.5–3.0 minutes to bring the flakes to a temperature not exceeding about 95° C., rapidly mixing the partially heated flakes for 5–10 seconds while admitting steam to provide a flake temperature of 99°–102° C. and a moisture content of 16–21 percent, directly admitting the hot, moist flakes to a steam-jacketed screw-type extruder equipped with air-lock dies and perforated final extrusion die, indirectly heating to 115°–145° C. during a total residence time of from 60 seconds to 90 seconds while exerting a screw-provided dynamic pressure on the flakes of about 375–400 p.s.i., the pressure being such as to expel from the soybean flakes only the amount of soybean oil that can be immediately resorbed by the said flakes on their being released from pressure, extruding the oil-covered hot soybean material into the atmosphere whereby the soybean cells are exploded and the surface oil resorbed, and drying the resulting agglomerates to a moisture content of 3–4 percent, whereby said agglomerates are storage-stable and can be milled.

References Cited by the Examiner

UNITED STATES PATENTS 2,343,149  2/1944  Krause _____ 99—98

RAYMOND N. JONES, *Acting Primary Examiner.*

S. E. HEYMAN, *Assistant Examiner.*